（12）United States Patent
Cervantes

(10) Patent No.: US 9,902,223 B2
(45) Date of Patent: Feb. 27, 2018

(54) COUPLABLE MOTOR VEHICLE WITH IMPROVED COUPLING

(71) Applicant: COMMISSARIAT A L'ENERGIE ATOMIQUE ET AUX ENERGIES ALTERNATIVES, Paris (FR)

(72) Inventor: Valery Cervantes, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/119,640

(22) PCT Filed: Jan. 28, 2015

(86) PCT No.: PCT/FR2015/050192
§ 371 (c)(1),
(2) Date: Aug. 17, 2016

(87) PCT Pub. No.: WO2015/128556
PCT Pub. Date: Sep. 3, 2015

(65) Prior Publication Data
US 2017/0080764 A1    Mar. 23, 2017

(30) Foreign Application Priority Data
Feb. 27, 2014  (FR) ..................................... 14 51590

(51) Int. Cl.
*B60D 1/48* (2006.01)
*B60D 1/66* (2006.01)
(Continued)

(52) U.S. Cl.
CPC ............... *B60D 1/485* (2013.01); *B60D 1/46* (2013.01); *B60D 1/665* (2013.01); *B60G 17/025* (2013.01)

(58) Field of Classification Search
CPC ............................... B60D 1/665; B60D 1/247
See application file for complete search history.

(56) References Cited

U.S. PATENT DOCUMENTS 2,302,246 A    4/1940  Nelson
2,570,482 A *  10/1951  Pruitt ................. B62D 53/0864
                                           280/476.1
(Continued)

FOREIGN PATENT DOCUMENTS

EP    0 799 730 A1    10/1997
FR      875.768       10/1941

OTHER PUBLICATIONS

International Search Report dated May 12, 2015, for PCT/FR2015/050192.

*Primary Examiner* — Kevin Hurley
(74) *Attorney, Agent, or Firm* — Oblon, McClelland, Maier & Neustadt, L.L.P.

(57) ABSTRACT

A motor vehicle includes a first wheel carrier to which is secured without any degree of freedom a rotational shaft of a wheel and which is displaceable between a remote position and a close position. The vehicle also includes a torsion bar including a first attachment point mechanically connected to the first wheel-carrier and a coupling bar securely attached to the chassis and includes, at a free end a coupling, the torsion bar including a second attachment point mechanically connected to the coupling bar in order to move the latter towards the upper position thereof as the first wheel-carrier moves towards its close position and in order to move it downwards as the first wheel-carrier moves towards its remote position.

8 Claims, 2 Drawing Sheets

(51) Int. Cl.
*B60D 1/46* (2006.01)
*B60G 17/02* (2006.01)

(56) References Cited

U.S. PATENT DOCUMENTS

| | | | | |
|---|---|---|---|---|
| 2,622,891 A * | 12/1952 | Knapp | ................... | A01B 69/00 |
| | | | | 280/476.1 |
| 3,930,670 A * | 1/1976 | Haskins | ................... | B60D 1/06 |
| | | | | 280/476.1 |
| 8,246,067 B1 * | 8/2012 | Flathers | ................ | B60D 1/075 |
| | | | | 280/407 |
| 2003/0038454 A1 * | 2/2003 | Valencia | ................ | B60D 1/075 |
| | | | | 280/511 |
| 2009/0127008 A1 * | 5/2009 | Batdorf | ................... | B60K 6/48 |
| | | | | 180/11 |
| 2016/0016619 A1 | 1/2016 | Cervantes et al. | | |

* cited by examiner

COUPLABLE MOTOR VEHICLE WITH IMPROVED COUPLING

The invention relates to a couplable motor vehicle having an improved coupling.

Couplable motor vehicles are known. The latter comprise a coupling adapted to cooperate with a corresponding coupling located on another vehicle, so as to attach these vehicles together and, alternately, detach them from one another. Generally speaking, this coupling is integral with the vehicle chassis. The ground clearance of this coupling can vary, for example, when the suspensions of the vehicle are compressed. Two vehicles can thus have their couplings positioned at different heights, which complicates the use of the couplings to couple these vehicles together.

The following documents FR875768A, EP0799730 and U.S. Pat. No. 2,302,246A are also known from the prior art.

There is therefore a need for a couplable motor vehicle having a coupling whose operation is simplified to attach this vehicle to another vehicle.

The invention thus relates to a motor vehicle capable of traveling on a flat road and in accordance with claim 1.

As the first wheel carrier is connected to the torsion bar, it moves in rotation about the transverse axis when this wheel carrier moves between its remote and close positions. As the coupling bar is also connected to the torsion bar, it moves with this rod, with a rotational movement about the transverse axis. The coupling thus accompanies the movement of the wheel carriers and thus of the vehicle relative to the ground. This movement limits the height variation of the coupling relative to the ground.

The embodiments of the invention may have one or more characteristics of claims 2 to 8.

These embodiments have the following further advantages:

the third attachment point makes it possible to take the displacement of both wheel carriers into account instead of only one;

the use of an anti-roll bar of the axle system as a torsion bar simplifies the construction of the vehicle.

The invention will become more apparent in the light of the following description given by way of non-limiting example and with reference to the figures which represent:

In these figures, the same references are used to designate the same elements.

In the remainder of this description, the characteristics and functions well known to those skilled in the art are not described in detail.

Figure 1:
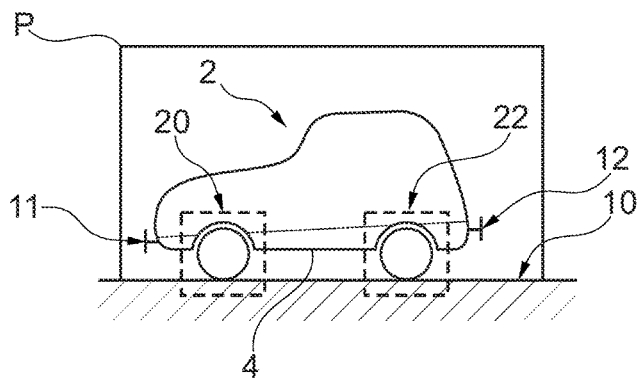
FIG. 1 is a schematic illustration of a couplable motor vehicle.

The FIG. 1 represents a couplable motor vehicle 2 equipped with a motor (not shown) for driving in rotation the drive wheels of the vehicle 2. For example, except for the improvements of the coupling described below, the vehicle 2 is identical to one of the articulated motor vehicles described in patent application FR1352128 filed on Mar. 8, 2013. Also, thereafter, only the improvements of the coupling will be described in detail. For additional details on the vehicle 2, reference may be made to the aforementioned patent application FR1352128.

Figure 2:
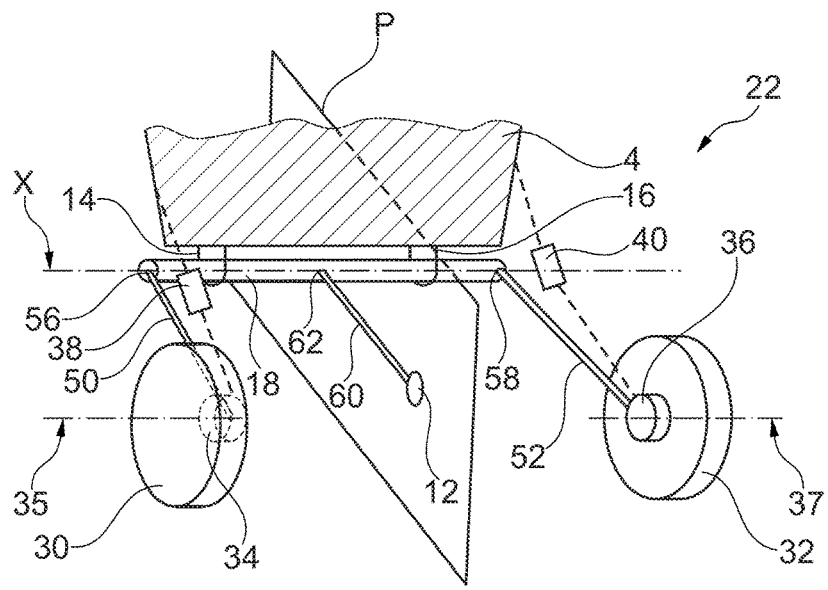
FIG. 2 is a schematic illustration in perspective view of an axle system of the motor vehicle of FIG. 2.

The vehicle 2 here comprises:

a chassis 4 on which are rotatably secured a plurality of wheels adapted to allow movement of the vehicle 2 by rolling on a road 10 when placed into motion by the engine of the vehicle 2;

front 11 and rear 12 couplings;

a torsion bar 18 (FIG. 2);

Here, the vehicle 2 extends along a longitudinal plane P, perpendicular to the running surface of the vehicle 2 and parallel to the direction of travel of the vehicle 2 when the latter travels in a straight line. The running surface is defined as the plane passing through the contact points between the road 10 and the wheels of the vehicle 2. The road 10 is flat and horizontal here. The plane P is thus vertical and perpendicular to the road 10. In this example, the chassis 4 comprises two front and rear parts articulated in relation to one another. The plane P is more particularly defined when the front and rear parts of the vehicle are aligned with respect to one another.

The couplings 11 and 12 are each adapted to cooperate with a corresponding coupling placed on another vehicle to alternately attach or detach the vehicle 2 to or from this other vehicle.

The wheels of the vehicle 2 are here divided between front 20 and rear 22 axle systems of the vehicle. These axle systems 20 and 22 are similar here and each comprise two wheels. For simplicity, hereinafter, only axle system 22 will be described in detail. From the description of the axle system 22, the person skilled in the art will know how to construct an axle system 20, with a mechanism to maintain the coupling 11 at a constant height relative to the road 10 regardless of the compression of the suspensions of this axle system 20. The axle system 20 could also comprise the steering device described in the aforementioned application FR1352128.

FIG. 2 shows the axle system 22 in greater detail. This axle system includes:

bearings 14, 16 fixed to the chassis 4 without any degree of freedom;

the bar 18;

the coupling 12;

two wheels 30 and 32 of the vehicle 2, two wheel carriers 34 and 36; and suspension systems 38 and 40.

In this example, the components of the axle system 22 are symmetrical with respect to plane P. Thus, only the elements located on the same side of the wheel carrier 34 will be described in detail in the following.

An axis of rotation of the wheel 30, which passes through the geometric center of the wheel carrier, is secured to the wheel carrier 34 without any degree of freedom.

In this description, the geometric center of an element is the barycenter of all the points of this element, each of these points being assigned a same weighting coefficient. The points of an element are those belonging to its outer casing.

The rotational axes of the wheels secured to the wheel carriers 34 and 36 bear the references 35 and 37, respectively. Here, the axes 35 and 37 are mutually parallel and extend perpendicularly to the plane P. The wheel 30 is secured to the wheel carrier 34 so as to be rotatably mobile about the axis 35.

The suspension 38 is mechanically connected to the chassis 4 on the one hand, and to the wheel carrier 34 on the other hand.

The suspension 38 mechanically connects the wheel carrier 34 to the chassis 4 so that part of the weight of the vehicle 2 bears on the wheel 30. The suspension 38 provides for a reversible displacement of the wheel carrier 34 relative to the chassis 4 along at least one degree of freedom. The wheel carrier 34 is thus displaceable in relation to the chassis 4 between:

a remote position, and a close position, in which the axis 35 of rotation (and therefore the center of the wheel carrier 36) is closer to the chassis 4 than in the remote position.

In this example, the wheel carrier 34 is adapted to move along a substantially vertical direction. More precisely, the geometric center of the wheel carrier 34 follows a substantially vertical trajectory during this movement. Here, the reversibility of the movement of the wheel carrier 34 is ensured owing to a damper (not shown in the figures) included in the suspension 38. More specifically, it is the elastic component of the damper (as opposed to its damping component) that allows the reversible displacement.

The suspension 38 is of McPherson type, for example. To simplify FIG. 2, the suspension 38 is not shown in detail although appears only in the form of dashed lines.

The bar 18 is rotatably mounted inside bearings 14 and 16 about a transverse axis X. Here, the axis X is perpendicular to plane P and parallel to the axes 35 and 37 of the wheels 30 and 32. Here, this bar 18 has a rectilinear shape and extends along the axis X.

The bar 18 is mechanically connected and without any degree of freedom to the wheel carriers 34 and 36 by respective mechanical connections. Thus, a displacement of the wheel carriers between their close and remote positions drives the bar 18 in rotation about the axis X.

For this purpose, the mechanical connection of the wheel carrier 34 comprises a lever 50 (first mechanical linkage). The lever 50 connects the wheel carriers 34 to the torsion bar 18 at an attachment point 56 of the bar 18. The point 56 here comprises an embedded connection, that is a zero degree-of-freedom linkage, between the lever 50 and the bar 18. The lever 50 here is rigid and has a rectilinear shape. The longest length of the orthogonal projection of the lever 50 is noted $D_l$ in the plane P. This length $D_l$ is measured in the plane P between the orthogonal projections in this plane P from the point 56 and the geometric center of the wheel carrier 34. The length $D_l$ is, for example, greater than 5 cm or 10 cm and less than 2 m or 1 m or 50 cm.

The respective symmetrical elements of the suspension 38, the lever 50 and the attachment point 56 with respect to the plane P bear the references 40, 52 (second mechanical linkage), and 58, respectively, in FIG. 2.

The point 56 is remote from the plane P. For example, point 56 is located at one end of the bar 18.

For example, when the wheel carrier 34 moves between its remote and close positions, the point 56 moves in rotation about the axis X which drives the bar 18 in rotation or in torsion proportionally to the displacement of the wheel carrier 34.

The coupling 12 is mechanically connected to the bar 18 by means of a rigid coupling bar 60. The rigidity of the bar 60, for example, is such that it can withstand a force greater than 100 N or 1000 N applied transversely without permanent deformation. The coupling 12 is adapted to move in a reversible manner owing to the movement of the bar 60 about the axis X, between:

a low position, and a high position in which the coupling 12 is higher relative to the chassis 4 than in the upper position.

The high and low positions are defined here with respect to the chassis. The height of the coupling relative to the chassis is defined, for example, for these low and high positions, in reference to a same plane integral with the chassis 4 and parallel to the running surface. Here, this plane is parallel to the road 10. This height is measured along a direction perpendicular to this plane between this plane and the geometric center of the coupling 12.

The bar 60 is anchored directly, without any degree of freedom, to the bar 18 by one of its ends, at an attachment point 62 located in the plane P. The other end of the bar 60 is secured to the coupling 12 without any degree of freedom. Here, the bar 60 has a tubular shape and extends longitudinally in the plane P. The coupling 12 is connected by embedding, that is with zero degree-of-freedom, with the bar 60.

Thus, when the point 62 moves in rotation about the axis X, the bar 60 and the coupling 12 also move in rotation about the axis X. More specifically, the coupling 12 moves:

toward its high position as point 62 turns upward, and toward its low position as point 62 turns downward.

The greatest length of the bar 60, is noted $D_a$. This length is measured in the plane P between the orthogonal projections in this plane P of the point 62 and of the geometric center of the coupling 12. The length $D_a$ is equal, to within 10% or to within 5% or preferably to within less than 2%, to the length $D_l$. The length $D_a$ is, for example, greater than 5 cm or 10 cm and less than 2 m or 1 m or 50 cm.

The angle between the orthogonal projections on the plane P of the bar 60 and the lever 50 is noted α. This angle α may vary when the wheel carriers 34, 36 and the bar 60 move and create a twisting motion of the bar 18. In the absence of torsion of the bar 18, the angle α is between −45° and +45° for example and, preferably, between −20° and +20°. Furthermore, here, the angle α is chosen so that the orthogonal projections of the lever 50 and the bar 60 are both systematically on the same side of the vertical plane containing the axis X. Specifically, in the case of the axle system 22, these orthogonal projections are set back from this vertical plane. Here, the rear is defined relative to the direction of forward travel of the vehicle 2. In the case of the axle system 20, these projections will be placed in front of the corresponding vertical plane.

Here, the point 62 is placed on the bar 18 in a location where the angular stiffness of the portion of the bar 18 located between this point 62 and the point 56 is equal, to within 10% or to within 5%, to the angular stiffness of the part of the bar 18 located between this point 62 and the point 58. Here, the bar 18 has a constant angular stiffness per unit of length over its entire length. The point 62 is thus placed equidistantly between points 56 and 58. The angular stiffness of the bar 18 is, for example, comprised between 100 and 1000 N·m·deg$^{-1}$ or between 200 and 800 N·m·deg$^{-1}$. For example, this angular stiffness is equal to 400 N·m·deg$^{-1}$.

Here, the bar 18 is an anti-roll bar of the axle system 22. For example, the bar 18 and the levers 50 and 52 form a single block of material formed contiguously and having a "U" shape. The levers 50 and 52 here form the lateral arms of the "U". For example, the bar 18 and levers 50, 52 are made of metallic material. Thus, the bar 18 limits the rolling motion that the vehicle 2 may have when moving through a turn.

The movement of the wheel carrier 34 and the coupling 12 will now be described in greater detail by means of FIGS. 3A and 3B.

When the wheel carriers 34, 36 are in the remote position (FIG. 3A), the coupling 12 is in the low position in relation to the chassis. This configuration corresponds, for example, to a nominal height of the vehicle 2 in relation to the road 10. The coupling 12 is located at a height h from the road 10. Here, the height h is measured along a vertical direction between the upper face of the road 10 and the geometric center of the coupling 12. The height h is, for example, greater or equal to 10 cm or 20 cm or 30 cm or 50 cm and less than or equal to 1.8 m or 1.5 m or 1 m.

Figures 3A, 3B:
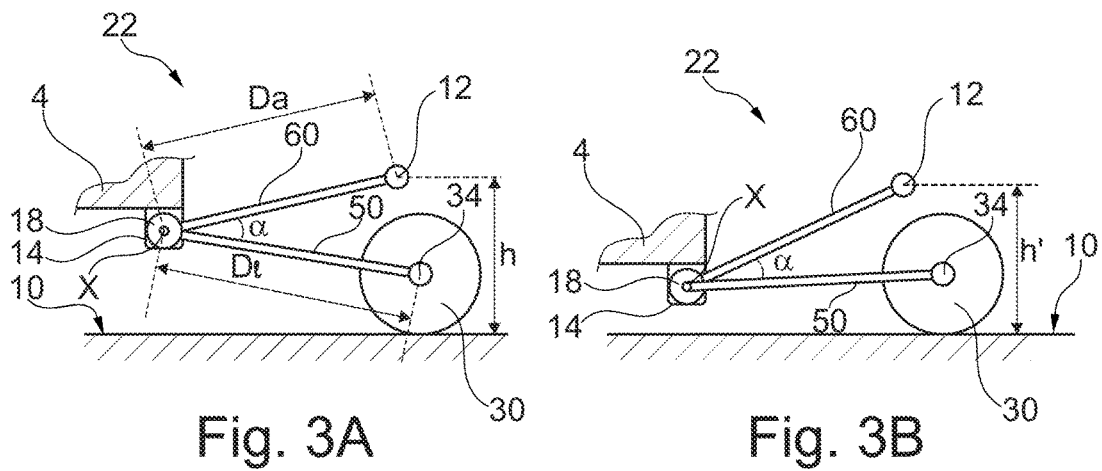
FIGS. 3A and 3B are schematic illustrations in a side view of the axle system in FIG. 2 whose wheel carriers are in remote and close positions, respectively.

While vehicle 2 is in use, for example, the wheel carriers 34, 36 move together toward their close position (FIG. 3B). This may be caused by a significant payload in the vehicle 2. The vehicle 2, and specifically the chassis 4, thus approaches the road 10. As the wheels of the vehicle 2 remain in contact with the road, they move relative to the chassis 4 while moving upward towards the chassis 4. The wheel carriers 34 and 36 therefore move simultaneously to their close position. When moving to their close position, the wheel carriers 34 and 36 drive the points 56 and 58 and therefore, here, the bar 18 in rotation about the axis X. The rotation of the points 56 and 58 has amplitude that is proportional to the displacement of the wheel carriers 34 and 36. The rotation of the points 56 and 58 in turn drives the point 62 in rotation about the axis X and thus the coupling 12 towards its high position relative to the chassis.

In the close position, the wheel carriers 34 and 36 are closer to the chassis 4 than in the remote position. The coupling 12 is in the high position. Its height relative to the chassis 4 is greater than in its low position. The change in position of the coupling 12 relative to the chassis 4 makes it possible, notably owing to the choice of the values of $D_l$ and $D_a$, to compensate for the fact that the chassis 4 is moving closer to the road 10. Thus, in the high position, the coupling 12 has a height h' in relation to the ground equal to within 20% or to within 10% or to within 5% of the height h. Here, the height h' is defined in the same manner as the height h.

Thus, the height of the coupling 12 is substantially constant regardless of the position of the wheel carriers 34, 36. It is thus easier to attach the vehicle 2 to another vehicle by means of the coupling 12 in relation to the case where the coupling bar is attached directly to the chassis 4. The height of the coupling 12 remains essentially constant. The height is said to be substantially constant if it remains equal within 20% or to within 10% or to within 5% of a reference value.

This configuration of the axle system 22 also facilitates load transfer and attitude balancing between two vehicles attached together by their couplings 11, 12. For example, the vehicle 2 is attached by the coupling 12 to the coupling 11 to the front of another motor vehicle which is structurally identical. This other vehicle, however, carries a heavier load than the vehicle 2. In this case, this other vehicle sags more in relation to the road 10 than the vehicle 2. Before coupling these two vehicles, the wheel carriers of the front axle of this other vehicle are in their close position, while those of the vehicle 2 are in their remote position. After coupling these both vehicles, due to the configuration of the axle system 22 of the vehicle 2 and of the front axle system of this other vehicle, a mechanical torque is applied in rotation about the respective axes X by the respective bars 60, on the respective torsion bars 18 of these axle systems. This results in a reaction force which is applied to the respective chassis by these vehicles, which balance their height relative to the other.

Load and attitude balancing between the two vehicles is exacerbated here by the fact that their couplings 11, 12 that are coupled between them are:

each connected without any degree of rotational freedom in pitch to their respective coupling bar, and connected without any degree of rotational freedom in pitch therebetween.

During the movement of the vehicle 2, it can undergo a rolling motion, for example due to deformations of the road 10 on which it is traveling. The wheel carriers 34 and 36 can thus move differently relative to each other. For example, when the vehicle 2 runs over a bump, the wheel carrier 34 is moved to its close position, but the wheel carrier 36 is not. For simplicity, it is considered that the chassis 4 does not undergo variation in attitude and the point 58 remains stationary. The bar 18 then undergoes a twisting motion. The point 62 is then driven in upward rotation about the axis X, with a balanced movement between those of points 56 and 58. In this example, owing to the choice of the position of the point 62 in relation to the points 56 and 58, point 62 is rotated about the axis X with amplitude equal to the average of the rotational amplitudes of points 56 and 58. While point 58 remains motionless here, this amplitude is equal to half the rotation range of the point 56.

Figure 4:
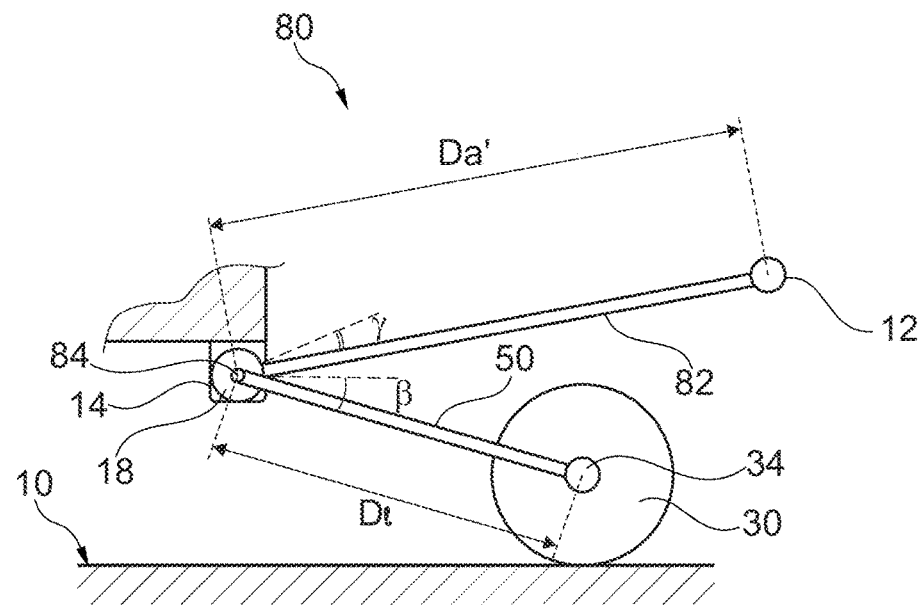
FIG. 4 is a schematic illustration in a side view of an axle system adapted to replace the axle system of FIG. 2.

FIG. 4 shows an axle system 80 suitable to replace the axle system 22. This axle system 80 is identical to the axle system 22, except that the bar 60 is replaced by a bar 82 of length different from bar 60. This bar 82 has a length $D'_a$ greater than the length $D_l$ by a multiplicative numerical factor F. For example, F is greater than 1.2 or 1.5 or 2. The length $D'_a$ here is defined in the same manner as the length $D_a$. The axle system 80 thus comprises reduction gear 84 for limiting the amplitude of rotation of the bar 82 about the axis X by a factor F. Thus, this maintains the coupling 12 to a substantially constant height, even if the lengths $D'_a$ and $D_l$ are different. The reduction gear 84 is designed to transmit a rotational motion to the bar 82 about the axis X in response to a rotational movement of the lever 50 about the axis X while reducing the amplitude of this movement of the factor F. The reduction gear 84 is, for example, placed on the connection between the lever 50 and the bar 18. The reduction gear 84 is thus configured to reduce the angular displacement of the point 56 by the factor F, when the wheel carrier 34 moves between its close and remote positions. More precisely, the gear 84 is configured so that the following relationship is satisfied:

$$\beta = \gamma * D'_a / D_l$$

where:

β is the absolute value of the angular displacement of the orthogonal projection in the plane P of the lever 50 when the wheel carrier 34 moves between the close and remote positions;

γ is the absolute value of the angular displacement of the orthogonal projection in the plane P of the bar 82 when the wheel carrier 34 moves between the close and remote positions.

For example, the reduction gear 84 comprises three gears engaged in rotation and adapted to rotate in a same direction about a same axis of rotation. One of the gears is integral with the lever 50 without any degree of freedom. Another of these gears is integral with the bar 18 without any degree of freedom.

Figure 5:
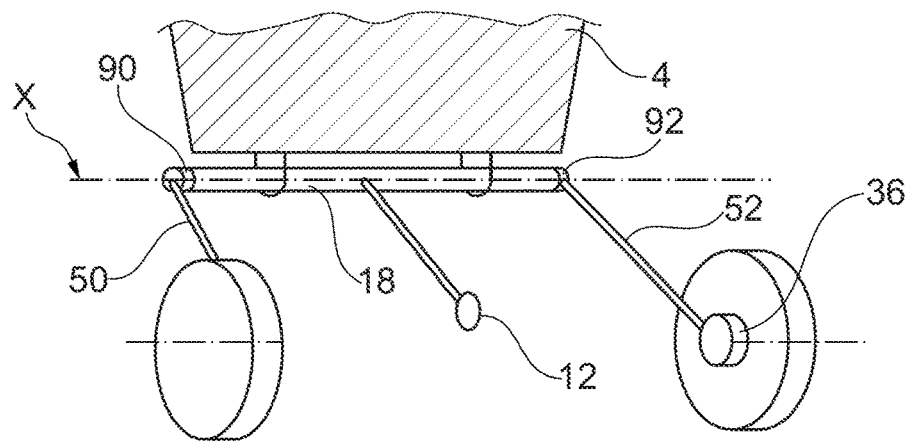
FIG. 5 is a schematic illustration in perspective view of another embodiment of the axle system of FIG. 2.

Alternatively, as shown in FIG. 5, the bar 18 is not formed contiguously with the levers 50, 52. For example, these levers 50, 52 are separate parts. The attachment points 56 and 58 comprise an elastomeric material 90, 92, for example, for mechanically connecting the levers 50 and 52 to the bar 18. This helps dampen mechanical shocks. This elastomeric material is, for example, known as a "bushing".

Numerous other embodiments are possible.

The vehicle 2 may be different. For example, vehicle 2 may not be articulated and not comprise front and rear parts for this purpose adapted to move in yaw rotation relative to the other. The vehicle 2 can have a number of different wheels. These wheels may be distributed differently in the axle systems. There may be more than two axle systems.

The vehicle 2 may have only one or the other of the couplings 11 and 12.

The vehicle 2 may not have an engine or a device for controlling this vehicle by a driver located onboard this vehicle. For example, vehicle 2 is a trailer.

The coupling 12 can be connected to the bar 60 differently. For example, it is not embedded with the bar 60 and may have a degree of freedom relative to this bar 60.

The effect of load and attitude balancing between vehicles attached to each other is exacerbated if the vehicles have no degree of freedom in pitch rotation due to their couplings. For this purpose, the respective couplings 12 of these attached vehicles, for example, do not have any degree of rotational freedom in pitch when they are coupled together. The coupling 12 is said to have a degree of rotational freedom in pitch if it can pivot relative to the bar 60 or relative to one or the other vehicle attached along an axis of rotation parallel to the axis X.

One or the other of the bearings 14 and 16 may be omitted.

The bar 18 can be made differently. In particular, the bar 18 is not necessarily rectilinear over its entire length. The bar 18 can, for example, have the shape of a crankshaft and, for this purpose, can comprise one or more "U-shaped" elbows on its length. The bar 18 may also be rectilinear and aligned along the axis X only at the level of the bearings 14 and 16.

Alternatively, the bar 18 is not necessarily an anti-roll bar. This is particularly the case when the suspension systems 38, 40 comprise a so-called active suspension system which plays a role in anti-roll compensation. The angular stiffness of the bar 18 is then chosen accordingly.

The angular stiffness of the bar 18 may be different. For example, the bar 18 is such that:

each lever 50 allowing vertical displacement, i.e. in a direction perpendicular to the road, of the wheel carrier 34 to which it is mechanically connected, of at most 1 cm or 2 cm or 5 cm when the point 58, to which the other lever 52 is connected, is immobilized in rotation about the axis X;

the bar 18 has an angular stiffness in excess of 10 kN·m·deg$^{-1}$ or 15 kN·m·deg$^{-1}$ or 20 kN·m·deg$^{-1}$.

In this description, the term "bar" used in reference to the bar 18 designates a torsion bar. The person skilled in the art knows that a bar, as rigid as it may be, can nevertheless be torsionally deformed if a sufficiently high torque is exerted.

The bar 18 can be positioned differently relative to the wheels of the axle system 22. For example, the bar 18 of the axle system 22 is positioned more rearward of the vehicle 2 than are the wheels 30, 32. The bar 60 then extends in the direction opposite the arms 50, 52. More exactly, the bar 18 is located between the axes 35, 37 and the rear end of the vehicle 2. In other words, the orthogonal projection on the plane P of the bar 60 is located relative to the vertical plane containing the axis X, on the side opposite to that where the orthogonal projections on this same plane P of the levers 50, 52 are located. In this configuration, the axle system 22 further comprises a transmission device so that the bar 60 and levers 50, 52 move in the same direction of vertical movement when they are set in motion. For example, the vertical displacement of an element is defined as the displacement of the orthogonal projection of this element on a vertical plane.

If the bar 60 extends rearwardly of the vehicle 2 while the levers 50, 52 extend in the opposite direction, toward the front of the vehicle 2, this gives rise to opposite vertical displacement directions when the bar 18 rotates. In such a case, the coupling 12 would move away from the chassis and would move toward the road 10 when the wheel carriers 34, 36 move closer to the chassis. This coupling 12 would no longer be at a substantially constant height relative to the road 10. To avoid this, the transmission device is placed in the connection:

between the bar 18 and each lever 50, 52, or between bars 18 and 60.

This transmission device comprises, for example, two intermeshing gears adapted to turn, in opposite directions of rotation, about parallel axes of rotation between them. For example, one of the gears is attached to the bar 18 without any degree of freedom, while the other is attached to the bar 60 without any degree of freedom. Thus, the displacement of the wheel carriers 34, 36 from their remote position to their close position drives a displacement of the coupling 12 from its low position to its high position, and not in the opposite direction.

The bar 18 may have a slight misalignment with respect to the axis X due to play in the connection of the bar 18 to the chassis and/or to the levers 50, 52. For example, the bar 18 has a gap in relation to the axis X of less than 20° or 10° or 5° and, preferably, less than 3° or 1°.

The axle systems 20 and 22 may be different. In particular, the axle systems 20 and 22 may comprise suspension systems of different geometries. The axle system 20 may further comprise a turning device for turning the wheels of this axle system 20.

The suspension systems 38, 40 may be different. For example, suspension systems can be used by wishbones, by axles, or telescopic type. The dampers of the suspension can also be connected differently to the wheel carriers, either directly or indirectly, for example by means of arms, a wishbone or connecting rods.

The levers 50, 52 are not necessarily rigid bars and may comprise a telescopic damper.

The bar 60 may be different. The length may be shorter than the length of a multiplicative factor F'. In this case, the reduction gear 84 is replaced by a multiplier with a factor F'' in order to increase the travel of the lever 50 by a multiplicative factor equal to F' so that the condition on the angle β is satisfied and thus so that the height of the coupling 12 is maintained.

The reduction gear 84 may be placed differently. For example, it is arranged on the connection between the bar 60 and the bar 18.

The invention claimed is:

1. A motor vehicle adapted to travel on a flat road, comprising:

a chassis extending in a plane parallel to the road;

a first wheel carrier to which is secured without any degree of freedom a rotational axis of a wheel, the axis passing through a center of the first wheel carrier;

a first suspension mechanically connecting the first wheel carrier to the chassis so that part of a weight of the vehicle bears on the wheel carried by the first wheel carrier, the suspension authorizing a reversible displacement of the first wheel carrier between a remote position and a close position in which the center of the first wheel carrier is closer to the chassis than in the remote position;

a bearing, secured without any degree of freedom, to the chassis;

a bar rotatably mounted about a transverse axis inside the bearing, the bar comprising a first attachment point mechanically connected to the first carrier wheel so that the first wheel carrier drives the first attachment point in rotation about the transverse axis in proportion to an amplitude of the displacement between the close and remote positions; and a coupling bar, attached to the chassis, comprising at a free end thereof a coupling adapted to cooperate with a corresponding coupling of another vehicle to connect them together and, alternately, to detach them from one other, the coupling bar being movable relative to the chassis in a reversible manner from a low position to a high position by rotating upward about the transverse axis, wherein the bar comprises a second attachment point mechanically connected to the coupling bar to move the coupling bar toward the high position as the first wheel carrier moves toward the close position and to move the coupling bar toward the low position as the first wheel carrier moves toward the remote position.

2. The vehicle as claimed in claim 1, wherein the bar is a torsion bar.

3. The vehicle as claimed in claim 2, wherein:

the vehicle comprises a second wheel carrier to which a rotational axis of a second wheel is secured without any degree of freedom, the rotational axis of the second wheel passing through the center of the second wheel carrier, the vehicle comprises a second suspension mechanically connecting the second wheel carrier to the chassis so that part of the weight of the vehicle bears on the wheel carried by this second wheel carrier, the second suspension authorizing a reversible displacement of the second wheel carrier between a remote position and a close position in which the center of the second wheel carrier is closer to the chassis than in the remote position, and the torsion bar comprises a third attachment point mechanically connected to the second wheel carrier so that the second wheel carrier drives the third attachment point in rotation about the transverse axis in proportion to the magnitude of the displacement between the close and remote positions, the second attachment point being located between the first and third attachment points at a location such that an angular stiffness of a portion of the torsion bar between the first and second attachment points is equal to, to within 20%, an angular stiffness of a portion of the torsion bar between the second and third attachment points.

4. The vehicle as claimed in claim 2, wherein a shortest distance between the axis of rotation of each of the wheel carriers and the transverse axis is equal to, to within 10%, a shortest distance between a geometric center of the coupling and the transverse axis.

5. The vehicle as claimed in claim 3, wherein:

the vehicle comprises a first mechanical linkage mechanically connecting the first attachment point to the first carrier wheel, the vehicle comprises a second mechanical linkage mechanically connecting the second attachment point to the second wheel carrier, each mechanical linkage allowing vertical movement of the wheel carrier to which it is mechanically connected, of at most 1 cm when the attachment point, to which the other mechanical linkage is connected, is immobilized in rotation about the transverse axis, and the torsion bar has an angular stiffness in excess of 10 $kN \cdot m \cdot deg^{-1}$.

6. The vehicle as claimed in claim 5, wherein the torsion bar and the first and second mechanical linkages form a single block of material.

7. The vehicle as claimed in claim 1, wherein the end of the coupling bar which is opposite the free end is directly connected mechanically to the second attachment point.

8. The vehicle as claimed in claim 1, wherein the coupling is mechanically connected to the coupling bar without any degree of rotational freedom in pitch and is adapted to be coupled without any degree of rotational freedom in pitch to a coupling of another vehicle.

* * * * *